March 7, 1961     S. S. FLASCHEN ET AL     2,974,203
CERAMIC ELECTROMECHANICAL TRANSDUCERS Filed April 29, 1958     2 Sheets-Sheet 1

INVENTORS   S. S. FLASCHEN
H. A. SAUER

BY Edwin B. Cave

ATTORNEY

RELATION OF RESISTANCE TO La CONCENTRATION

INVENTORS: S.S. FLASCHEN
H.A. SAUER
BY Edwin B. Cave
ATTORNEY

2,974,203

CERAMIC ELECTROMECHANICAL TRANSDUCERS

Steward S. Flaschen, New Providence, N.J., and Harold A. Sauer, Hatboro, Pa., assignors to Bell Telephone Laboratories, Incorporated, New York, N.Y., a corporation of New York Filed Apr. 29, 1958, Ser. No. 731,752

9 Claims. (Cl. 179—110)

This invention relates to ceramic compositions and especially to ceramic composition of particular value in pressure sensitive devices such as theremistors, resistors, and transducers.

As is well known, pressure sensitive devices require materials with a large piezoresistive response to applied hydrostatic or unidirectional pressure. Materials heretofore used have been alloys, ceramics, or single crystals. Of these, materials based on oriented single crystals have been used the most extensively since the known metals and ceramics exhibit a relatively small piezoresistive effect. However, the use of such crystals in pressure sensitive devices has many disadvantages. The growth, orientation and fabrication of a single crystal has proven to be an expensive, difficult and time-consuming process. Such crystals must be formed from single crystal seeds. Since they are anisotropic bodies, care must be taken not to misalign the final device in respect to the preferred molecular axis of orientation which misalignment would result in a lower piezoresistive effect. Therefore, fabrication of these crystals into the desired shape is difficult and time-consuming.

In accordance with the present invention, applicants have found that when certain impurities have been added to a special area of the barium-strontium-titanate system a ceramic material exhibiting a large positive piezoresistive effect is produced. This material is superior to any commercially available material, alloy, ceramic, or single oriented crystal, on the basis of the piezoresistive effect. Such a large positive piezoresistive effect is unusual in the ceramic field. Ceramics in general exhibit negative piezoresistive effects due to the voids in the ceramic filling in under applied pressure.

Applicants' new ceramic material is a polycrystalline isotropic body. Therefore no preferred molecular axis of orientation is necessary to give an optimum piezoresistive effect. This means that in fabrication of the ceramic it is unnecessary to take care in alignment of the axis. Additionally, since applicants' material is based on the ceramic art, it has the inherent advantage of being easy to form and shape in device preparation in accordance with well known techniques.

The semiconduction exhibited by applicants' ceramic material is produced by substitution of a trivalent lanthanum ion in a divalent barium-strontium site in the barium-strontium-titanate crystalline lattice. This substitution provides a valency controlled n-type semiconductor exhibiting a large positive piezoresistive effect. These substituted barium-strontium-titanate semiconductors are not oxygen deficient structures. This endows them with stable properties in contrast to reduced materials which inherently lack stability due to reoxidation at room or elevated temperatures.

Briefly, in accordance with the present invention, there is provided a ceramic composition exhibiting a large positive piezoresistive effect of partcular value in pressure sensitive devices. The particular range of compositions expressed in mol fractions yielding a good piezoresistive effect is represented by the approximate formula:

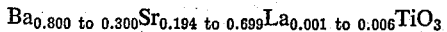

Within this range, a preferred barium-strontium-lanthanum content results in the following formula:

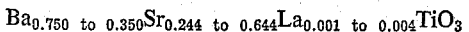

A more complete understanding of the features of this invention, together with additional objects thereof, may be gained from a reading of the following description in conjunction with the accompanying drawings, in which.

Figure 1:
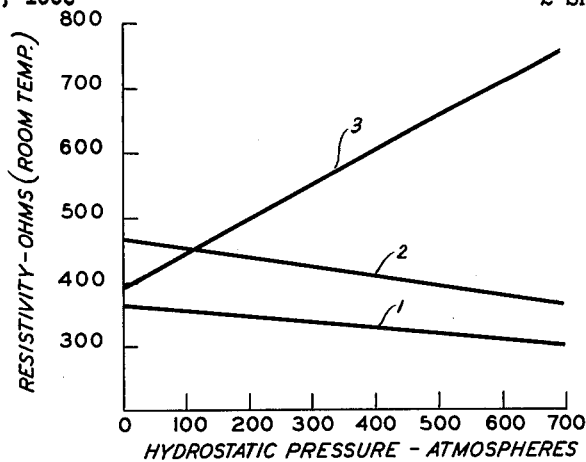
Fig. 1 is a plot of resistance changes of various polycrystalline oxide semiconductors including a composition of this invention under hydrostatic pressure at room temperature.

Referring again to Fig 1, curve 1 depicts the resistance change of a p-type nickel-maganese oxide ceramic semiconductor under varying hydrostatic pressure at room temperature. As indicated, the resistance decreases as a linear function of increasing pressure. Curve 2 depicts the resistance change of an n-type, non-stoichiometric reduced barium titanate ceramic semi-conductor under varying hydrostatic pressure at room temperature. Again, the resistance decreases as a linear function of increasing pressure. Curve 3 depicts the resistance change of a typical composition of this invention having the formula $Ba_{0.600}Sr_{0.397}La_{0.003}TiO_3$ under varying hydrostatic pressure at room temperature. For the composition, the resistance increases as a linear function of the pressure.

Whereas ceramics in general, exemplified by the compositions of curves 1 and 2, exhibit negative piezoresistive effects, the compositions of this invention, represented by curve 3, exhibit a positive piezoresistive effect.

Figure 2:
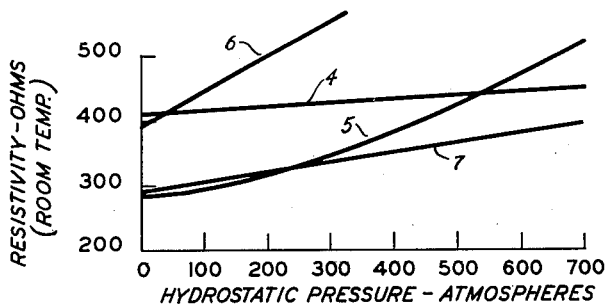
Fig. 2 is a plot of resistance changes for various compositions in the barium-strontium-lanthanum-titanate system under varying hydrostatic pressure at room temperature.

Referring to Fig. 2, curve 4 depicts the positive piezoresistive effect exhibited by a composition of this invention having the formula $Ba_{0.800}Sr_{0.197}La_{0.003}TiO_3$. As seen, the slope of this curve is small. Decreasing the amount of barium and increasing the amount of strontium accordingly results in a steeper slope as shown by curve 5, which illustrates the piezoresistive effect exhibited by the composition $Ba_{0.750}Sr_{0.247}La_{0.003}TiO_3$. The result of further decreases in barium and corresponding increases in strontium is shown by curve 6 which illustrates the even steeper piezoresistive slope exhibited by the composition $Ba_{0.600}Sr_{0.397}La_{0.003}TiO_3$. As the amount of barium is decreased even more, the piezoresistive slope begins to decrease. Curve 7, representing the piezoresistive slope exhibited by the composition

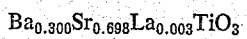

again shows a minimum positive piezoresistive slope slightly steeper than the slope of curve 4.

It is evident that, starting with a critical barium-strontium composition, a positive piezoresistive slope can be achieved. As the amount of barium is decreased, the slope is increased to a maximum. Further decreases in barium decrease the piezoresistive slope until a critical barium-strontium composition is reached which again exhibits a minimum positive piezoresistive slope.

Fig. 2 also shows that initial resistivity varies with the particular ceramic composition. This enables pressure sensitive devices using compositions of this invention to possess the desired initial resistivity appropriate to the intended use.

Figure 3:
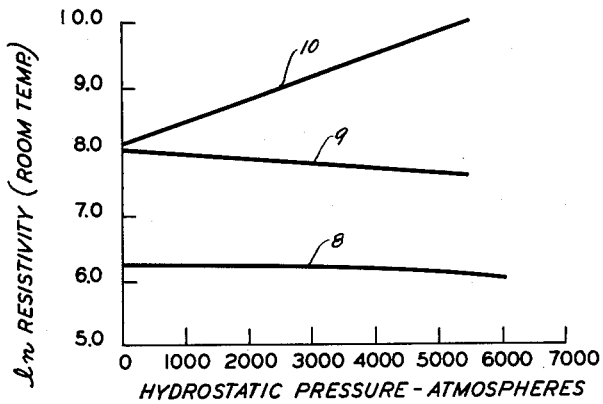
Fig. 3 is a plot of resistance changes of various semiconductors comparing the characteristics of an inventive composition and two known compositions under increasing hydrostatic pressures up to 6,000 atmospheres at room temperature.

Fig. 3 shows the results of studies on various semiconductors carried out to 6,000 atmospheres. For comparative purposes, the hydrostatic pressure response of a silicon single crystal, curve 8, a typical ceramic semiconductor of the nickel-manganese oxide system, curve 9, and a barium-strontium-lanthanum-titanate composition of this invention, curve 10, are shown. The linearity of the barium-strontium-lanthanum-titanate curve of Fig. 2 indicates an essentially constant positive coefficient over the extended pressure range.

Figure 4:
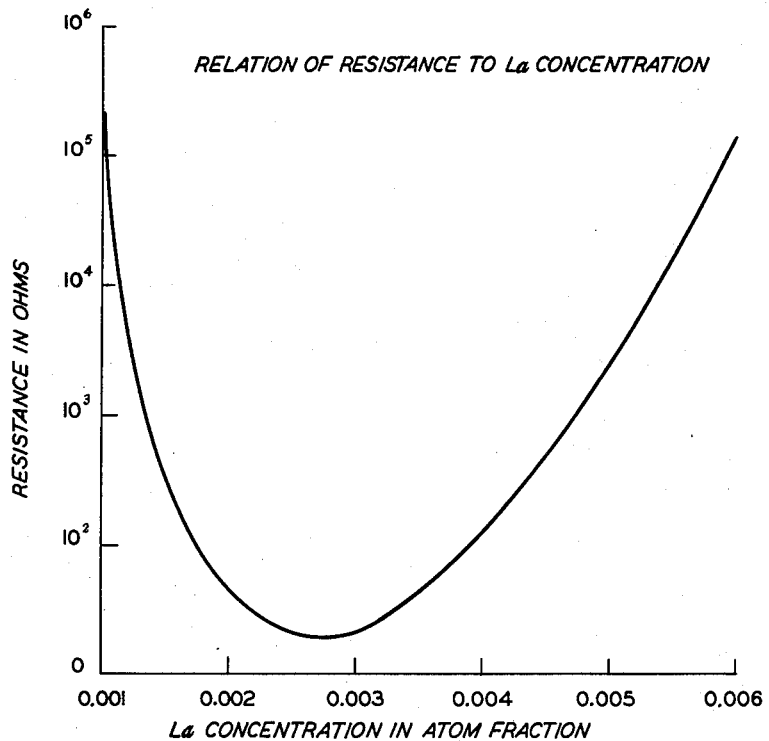
Fig. 4 is a plot showing the relationship of resistance to lanthanum concentration in the crystal lattice for various barium-strontium-titanate compositions.

Fig. 4 shows the effect on resistivity of varying lanthanum content in the barium-strontium-lanthanum-titanate compositions of this invention. A lanthanum content expressed in mol fractions of from 0.001 to 0.006 defines the semiconductor resistivity range in accordance with conventional definition. Above 0.006 and below 0.001 the composition becomes an insulator. Although this curve is based on an initial barium-strontium concentration of $Ba_{0.700} Sr_{0.300} TiO_3$ it has been found to obtain for all included concentrations of barium and strontium to which lanthanum might be added since the amount of lanthanum is so small as to have little effect on resistivity.

Figure 5:
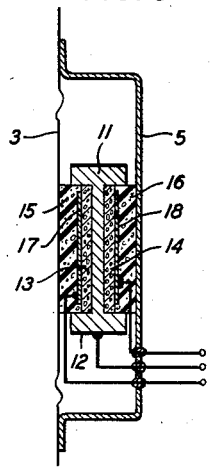
Fig. 5 is a cross-sectional view of an electro-mechanical transducer utilizing ceramic compositions of this invention.

Fig. 5 depicts a microphone construction well known in the art which contains a ceramic composition of this invention. For a detailed description of this device reference is had to United States Patent 2,497,770, issued February 14, 1950. Briefly, cylindrical recesses are formed, as by grinding, on the two sides of a semiconductor block 11 formed from compositions of this invention, these recesses being separated by a thin disc of the semiconductor. The periphery of the block is coated with a layer or band 12, of low ohmic resistance material such as rhodium which forms a base terminal for the transistor. The two recesses are partially filled with granules 13, 14 of conducting material, such as carbon, and the two groups of granules are held in place by retaining plugs 15, 16 of a pliable material such as soft rubber. Electrical contact to the two piles of granules is made by means of thin conducting membranes 17, 18 between the rubber 15, 16 and the granules 13, 14. The two sets of conducting granules form multiple emitter and collector contacts against the semiconductor block 11. The assembly is sandwiched between a movable diaphragm 3 and a rigid supporting member 5 in such a manner that when a positive pressure is exerted on the diaphragm 3 there occurs an increase in the contact pressure between the granules of each group and also between the two groups of granules and the semiconductor block 11, these increased pressures occurring simultaneously in all parts. If the pressure on the diaphragm is varied as by the action of an incident sound wave, the pressure variations between granules and between the granules and the semiconductor occur in phase and correspond to the pressure variations in the incident sound wave. Thus an amplified version of the sound wave appears in the ouput circuit.

Within the pressure range here discussed, the piezoresistive effect in the titanates is found to be reversible with non-identifiable hysteresis, that is, when the applied pressure is lowered or removed the titanate system returns to normal with no distortion of the crystalline lattice and no induced orientation. Barium-strontium-lanthanum-titanates in the previously mentioned compositional ranges reduced by hydrogen or vacuum treatment to yield the non-stoichiometric semiconductors are found to exhibit the undesirable characteristics of curve 2, Fig. 1.

A method of preparing ceramic articles of the compositions disclosed herein is outlined below. Other methods will be apparent to those skilled in the art. To expedite teaching the preparation of these articles, firing times, temperatures, and pressures are given which have been found to be satisfactory. Others which are familiar to those skilled in the art can be used.

The conventional starting materials used in preparing the known barium-strontium-titanate systems of the prior art can be used in practicing applicants' invention, as, for example, barium carbonate, strontium carbonate, titanium dioxide and oxides or oxysalts of barium and strontium that decompose under firing conditions to the desired titanate. The lanthanum ion can be introduced into the titanate as a lanthanum oxide, oxalate, nitrate, chloride, fluoride, or any other lanthanum compound which will decompose to the oxide upon firing by usual ceramic techniques.

The ingredients are first mixed in a ball mill as a thin slurry for, example, sixteen to twenty-four hours. An active surface agent such as an aerosol or tergitol, which aids in the intimate blending of the mixture so that the components are uniformly dispersed throughout, is desirably added during the milling operation. Though an aqueous slurry is generally used, the water solubility of some of the initial component compounds contemplated above may dictate the preferential use of a non-aqueous liquid, as for example, acetone, carbon tetrachloride, or ethanol.

After mixing, the paste or slurry is dried by filtration as, for example, in a Büchner funnel, and then heated to incipient dryness, a temperature of 110° C. to 150° C. for eight hours to sixteen hours having been found suitable.

The ceramic material from which the liquid has been removed in such manner is then calcined in accordance with accepted practice to remove those components in the starting material not desired in the final product. An illustrative example comprises heating the ceramic in an oxidizing atmosphere such as air over an approximate temperature range from 1000° C. to 1200° C. for a period of approximately one to four hours.

The agglomerations formed during the calcining step are broken up by ball milling for a period of approximately sixteen to twenty-four hours in water or other carriers. Acetone, ethanol, and carbon tetrachloride have been found suitable. Although a long ball milling gives smaller particles which result in a denser final product, there does not appear to be any significant decrease in particle size after twenty-four hours. In accordance with accepted practice, a binder and lubricant such as polyvinyl alcohol may be added during the ball-milling cycle to aid in properly binding the composition together.

The ball-milled slurries are then dried by evaporation or filtration. The drying is continued until all moisture has been removed as, for example, by heating in a drying oven at approximately 100° C. to 200° C. for several hours. The dried solids may then be granulated into particles of nearly uniform size by forcing the solids through, for example, a 100-mesh screen which is of 149 micron size.

The particles are next formed into the desired configuration under high pressures as, for example, 1,000 to 10,000 pounds per square inch. Appropriate pressures suitable in the obtaining of the desired configurations are known to those skilled in the art.

The formed ceramic next undergoes final firing to fully crystallize the lanthanum substituted barium-strontium-titanate system as, for example, by heating at approximately 1300° C. to 1400° C. for a few hours. The firing is carried out in an oxygen-containing atmosphere such as air to prevent reduction in the final product. The product is also cooled in such an atmosphere, the cooling rate being sufficiently slow to prevent thermal shock. A cooling rate of 200° C. per hour has been found suitable.

Specific examples of two barium-strontium-lanthanum-titanate semiconductors prepared by the above-described process are given below.

Example 1

3.7 grams of lanthanum oxalate, 204.1 grams of strontium carbonate, 414.5 grams of barium carbonate, 281.6 grams of titanium oxide, and 2 liters of water were mixed in a ball mill as a thin slurry for twenty-four hours. To this slurry was added 20 grams of aerosol, an active surface agent which aids in the intimate blending of the mixture. After mixing, the slurry was dried by filtration in a Büchner funnel and then heated to incipient dryness in a drying oven overnight at a temperature of 120° C.

The ceramic material from which the liquid has been removed in such a manner was then calcined in air at a temperature of 1000° C. for four hours. After calcining, the agglomerations were broken up by ball milling for twenty hours in water.

The ball-milled slurries were then dried by filtration. This drying was continued by heating in a drying oven at 110° C. for ten hours. The dried solids were then granulated into particles of nearly uniform size by forcing the solids through a 100-mesh screen.

The granules were formed into the desired shape under a pressure of 5,000 pounds per square inch. Final firing of the pressed article was then carried out at a temperature of 1350° C. for one hour. This firing was carried out in air. The article was also cooled in such an atmosphere.

The composition of the article whose preparation is described above corresponds to the formula:

$$Ba_{0.600}Sr_{0.397}La_{0.003}TiO_3$$

The piezoresistive response exhibited by this composition is shown by curves 6 and 9 of Figs. 2 and 3.

Example 2

3.2 grams of lanthanum oxalate, 109.5 grams of strontium carbonate, 544.0 grams of barium carbonate, and 241.5 grams of titanium oxide, 99.3 percent pure, were formed into a shaped article by the previously described process. The composition was as follows:

$$Ba_{0.750}Sr_{0.247}La_{0.003}TiO_3$$

The piezoresistive response exhibited by this composition is shown by curve 5 of Fig. 2.

What is claimed is:

1. A stoichiometric semiconducting ceramic composition exhibiting a positive piezoresistive effect having the following composition expressed in mol fractions:

$$Ba_{0.750 \text{ to } 0.350}Sr_{0.244 \text{ to } 0.644}La_{0.001 \text{ to } 0.006}TiO_3$$

2. A stoichiometric semiconducting ceramic composition exhibiting a positive piezoresistive effect having the following composition expressed in mol fractions:

$$Ba_{0.750 \text{ to } 0.600}Sr_{0.244 \text{ to } 0.397}La_{0.001 \text{ to } 0.006}TiO_3$$

3. A stoichiometric ceramic composition exhibiting a positive piezoresistive effect having the following composition expressed in mol fractions:

$$Ba_{0.600}Sr_{0.397}La_{0.003}TiO_3$$

4. A stoichiometric ceramic composition exhibiting a positive piezoresistive effect having the following composition expressed in mol fractions:

$$Ba_{0.750}Sr_{0.247}La_{0.003}TiO_3$$

5. An electromechanical transducer which comprises a fixed support, a movable diaphragm mounted adjacent said support, a container having walls of yielding insulating material mounted between said diaphragm and said support in position to be compressed by movements of said diaphragm toward said support, a semiconductive body having the composition $$Ba_{0.750 \text{ to } 0.350}Sr_{0.244 \text{ to } 0.644}La_{0.001 \text{ to } 0.006}TiO_3$$

mounted within said container as a partition forming two separate chambers, and grains of conducting material substantially filling each of said chambers, whereby movements of said diaphragm permitted by the yielding of said container are translated into pressures of said grains against both sides of said semiconductive partition, which pressures are equalized by movement of said partition.

6. A pressure sensitive device comprising an element having a stoichiometric ceramic composition of the following composition expressed in mol fractions:

$$Ba_{0.750 \text{ to } 0.350}Sr_{0.244 \text{ to } 0.644}La_{0.001 \text{ to } 0.006}TiO_3$$

at least two spaced electrodes contacting said element, and means for exerting pressure on said element.

7. A pressure sensitive device comprising an element having a stoichiometric ceramic composition of the following composition expressed in mol fractions:

$$Ba_{0.750 \text{ to } 0.600}Sr_{0.244 \text{ to } 0.397}La_{0.001 \text{ to } 0.006}TiO_3$$

at least two spaced electrodes contacting said element, and means for exerting pressure on said element.

8. A pressure sensitive device comprising an element having a stoichiometric ceramic composition of the following composition expressed in mol fractions:

$$Ba_{0.600}Sr_{0.397}La_{0.003}TiO_3$$

at least two spaced electrodes contacting said element, and means for exerting pressure on said element.

9. A pressure sensitive device comprising an element having a stoichiometric ceramic composition of the following composition expressed in mol fractions:

$$Ba_{0.750}Sr_{0.247}La_{0.003}TiO_3$$

at least two spaced electrodes contacting said element, and means for exerting pressure on said element.

References Cited in the file of this patent

UNITED STATES PATENTS

| | | |
|---|---|---|
| 2,497,770 | Hanson | Feb. 14, 1950 |
| 2,520,376 | Rorys et al. | Aug. 29, 1950 |

FOREIGN PATENTS

| | | |
|---|---|---|
| 574,577 | Great Britain | Jan. 11, 1946 |

OTHER REFERENCES

Verwey et al.: "Controlled-Valency Semiconductors," Philips Res. Rep. 3, 178–187, 1950 (p. 178 is pertinent).